Jan. 15, 1963 C. V. TILDEN 3,072,964
APPARATUS FOR FORMING SHEET PLASTIC MATERIAL
Filed Jan. 8, 1960 3 Sheets-Sheet 1
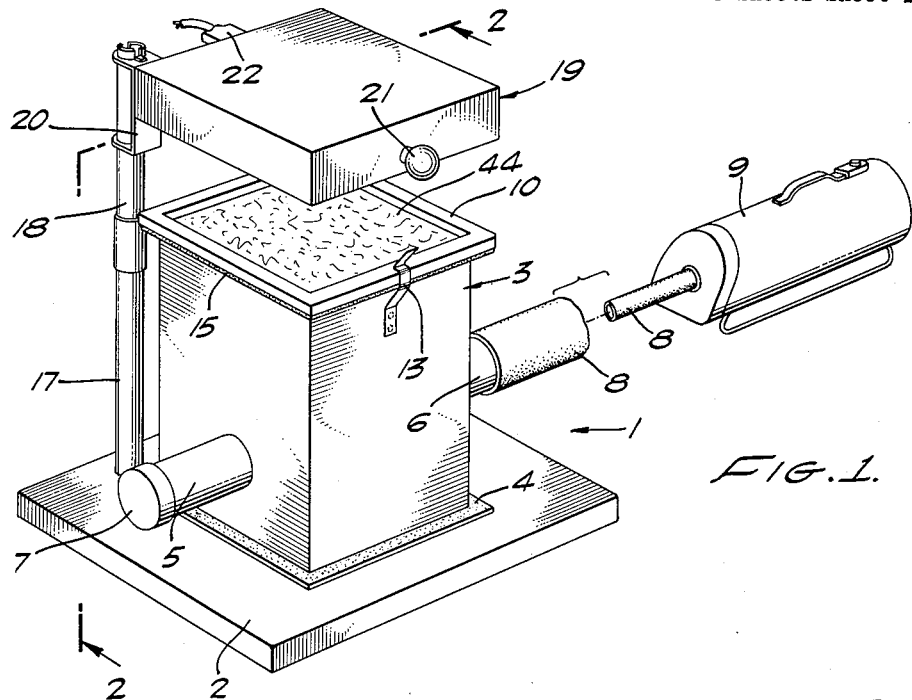
FIG. 1.
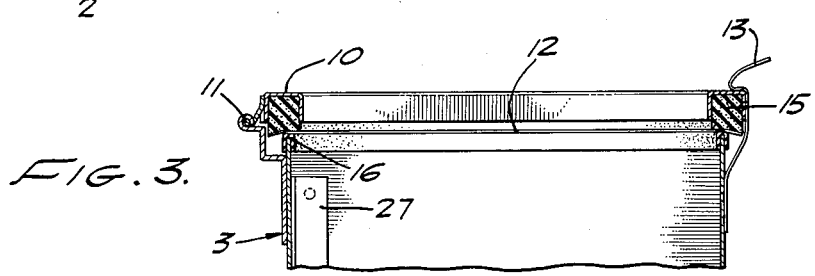
FIG. 3.
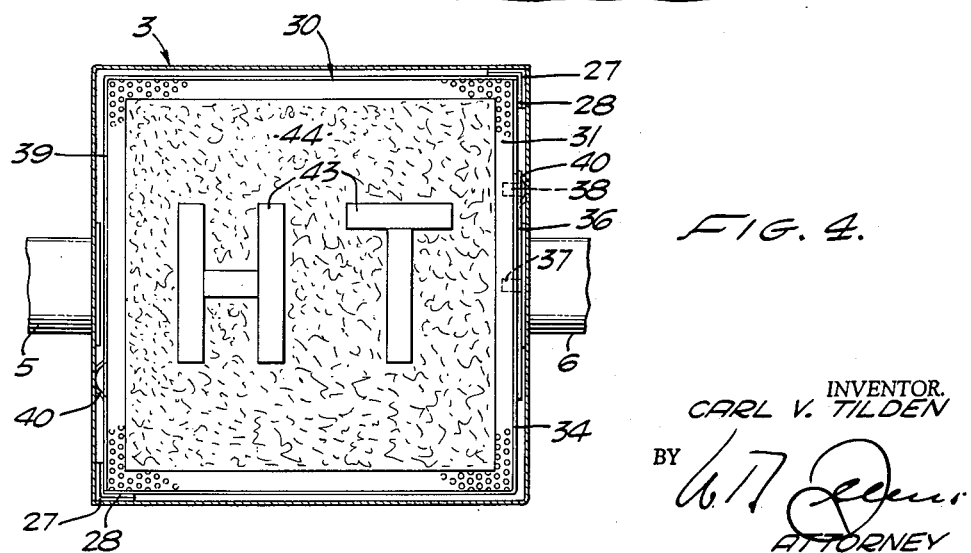
FIG. 4.
INVENTOR.
CARL V. TILDEN
BY
ATTORNEY

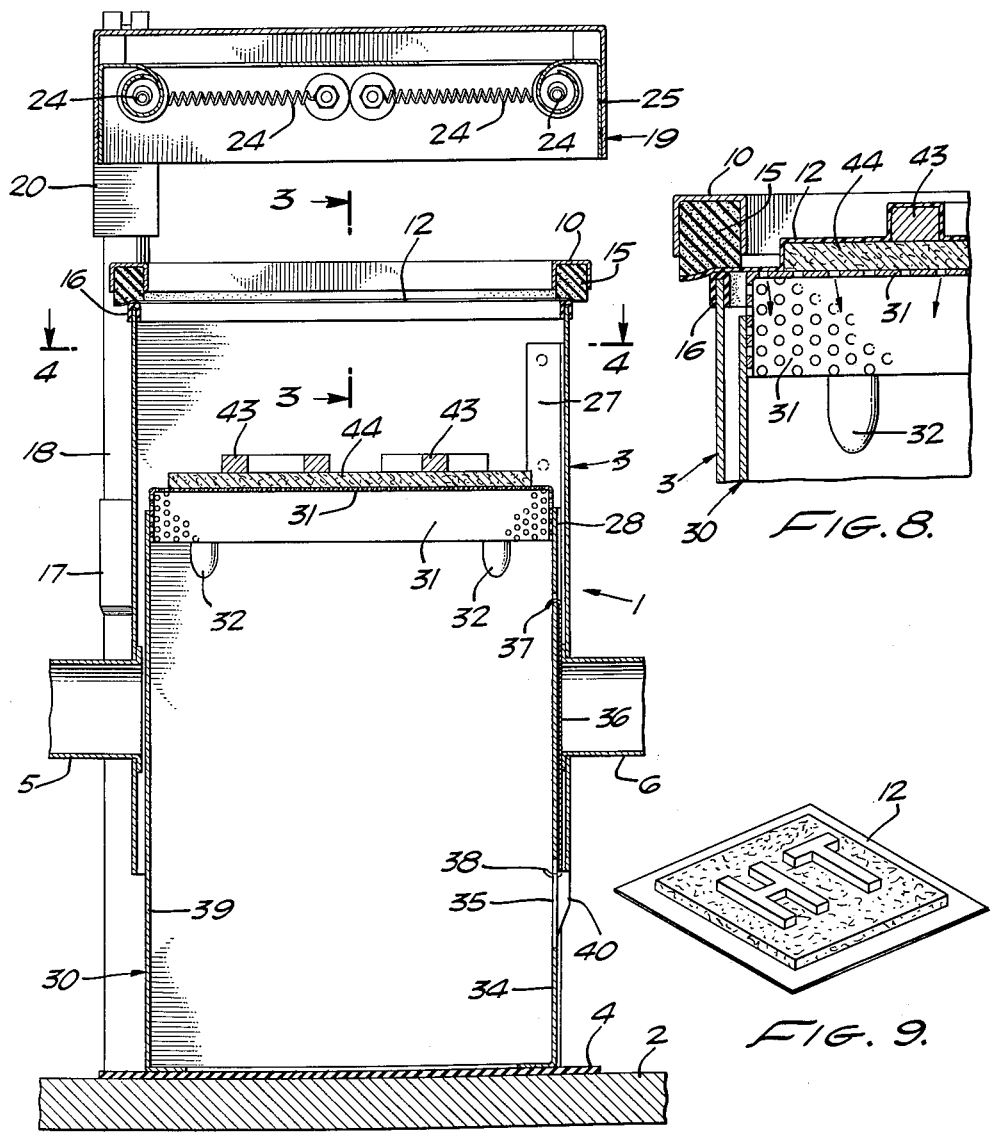
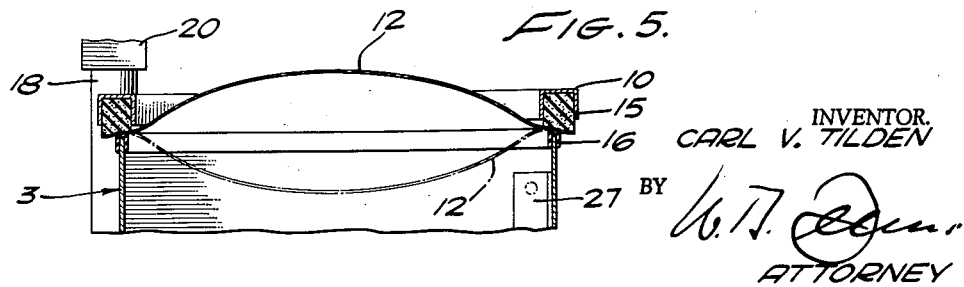

Jan. 15, 1963  C. V. TILDEN  3,072,964
APPARATUS FOR FORMING SHEET PLASTIC MATERIAL
Filed Jan. 8, 1960  3 Sheets-Sheet 3

INVENTOR.
CARL V. TILDEN
BY
ATTORNEY

United States Patent Office 3,072,964
Patented Jan. 15, 1963

3,072,964
APPARATUS FOR FORMING SHEET PLASTIC
MATERIAL
Carl V. Tilden, 26315 via Canon, Capistrano Beach, Calif.
Filed Jan. 8, 1960, Ser. No. 1,332
15 Claims. (Cl. 18—19)

This invention relates to an apparatus for forming sheet plastic material and more particularly for reproducing designs in and on sheet plastic material and covering objects with such material.

The invention is particularly desirable for use in transferring a raised or recessed design from any object onto a sheet of plastic which is soft when heated and which returns to its normal firm condition when cooled. In the prior practice heated plastic materials have been formed by applying a vacuum to the sheet material so as to draw it onto the design mold, but these previous vacuum-forming techniques have been characterized by excessive and non-uniform thinning of the material, particularly near the center of the initially planar plastic sheet as it is drawn to a centrally located high or low point on the design.

According to the invention, the previously experienced difficulty has been overcome by uniformly heating the plastic sheet to be formed and as a first step increasing the air pressure between the design to be copied and the plastic sheet, and as a second step immediately applying a vacuum to the mold and to the softened plastic sheet to displace the latter into conformity with the former. This pressure applied to the evenly heated, softened plastic sheet thins it evenly by stretching it away from the mold so that it is in a stretched condition to be formed on the mold at the time the vacuum is applied.

Stretching the soft plastic sheet by the increased air pressure prior to bringing it into conformity with the mold provides the additional advantage of an air cushion between the sheet and the mold which prevents undesirable distortion or cutting of the sheet. Immediately after the air pressure has been increased, and as the sheet is upon or adjacent the mold, the vacuum is communicated to the mold and to the plastic and immediately draws the sheet onto the design where the exact configuration of the latter is transferred to the plastic sheet.

The apparatus for transferring the configuration of the mold to the plastic sheet comprises a pair of telescoping housings the inner and lower of which is fixed to a supporting base and carries an upwardly facing perforated plate. The second or outer housing is slidable vertically on the inner housing and has a hinged frame for clamping in place the sheet of plastic to be molded. A heater is mounted as to be movable into and out of adjacency with the plastic sheet carried by the upper housing with the latter in an upper position. When so related the heater heats the plastic to a softened state after which the outer casing is quickly moved to a lower position and downwardly on the inner casing to bring the periphery of the plastic sheet into substantially the same plane as the mold which is supported on the perforated plate adjacent the top of the inner casing. The lowering of the outer casing quickly builds up the air pressure between the plastic sheet and the mold and causes the sheet to be expanded from the mold and to be thinned uniformly. Immediately thereafter, and upon the outer housing being further lowered until its lower extremity moves into sealing relationship with the base, vacuum is applied to the interior of both housings at which time the plastic sheet is drawn onto the mold and conformed to the configuration of the design. The plastic cools and takes a firm set almost immediately and the completed molded product can be taken from the upper end of the outer casing, the heater being displaced to the side.

An object of the invention is to provide improved apparatus for vacuum-forming plastic sheets into preselected designs.

A further object of the invention is to provide an apparatus by which a sheet of plastic material to be molded is first heated inwardly from its periphery and then expanded while soft to insure uniform thinning of the material.

A principal object of the invention is to provide an apparatus for drawing plastic sheets to form a sealed package for the purposes of both display and preservation.

Another object of the invention is to provide an apparatus for molding plastic sheets in which a heated and softened sheet of plastic material to be placed upon a mold is subjected to an increase in air pressure and, as it is moved adjacent the mold, is suddenly subjected to suction.

It is still another object of the invention to provide an apparatus for molding a plastic sheet into conformity with a preselected surface comprising the steps of heating the sheet to render it soft, stretching it while soft and before bringing it into contact with the mold, and then displacing the sheet by suction into conformity with the mold surface.

A still further object of the invention is the provision of a simple molding apparatus suitable for use by hobbyists which is of simple and economical construction, which is easy to operate, and which can make use of the ordinary household suction cleaner to provide the required suction and the conventional household electric current to provide heat.

These and other more specific objects will appear upon reading the following specification and claims and upon considering in connection therewith the attached drawings to which they relate.

Referring now to the drawings in which a preferred embodiment of the invention is illustrated:

FIGURE 1 is a perspective view of the apparatus according to the present invention with a conventional vacuum source attached;

FIGURE 2 is a sectional view taken upon the vertical line 2—2 on FIGURE 1;

FIGURE 3 is a fragmentary vertical sectional view upon the section 3—3 of FIGURE 2;

FIGURE 4 is a horizontal section upon the line 4—4 of FIGURE 2;

FIGURE 5 is a fragmentary sectional view of the upper end of the outer housing of the apparatus illustrating two of the positions a sheet of plastic material assumes during the forming operation;

FIGURE 8 is an enlarged fragmentary view of the upper end of the housings positioned as illustrated in FIGURE 7; and FIGURE 9 is a perspective view of the molded sheet of plastic material viewed from the apparatus after the completion of the final step.

Figure 7:
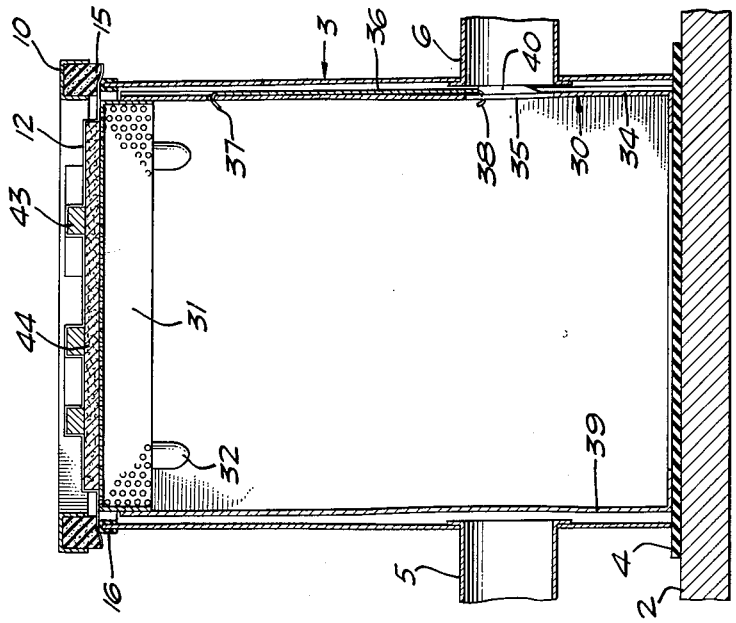
FIGURE 7 is a view similar to FIGURE 6 but with the outer housing in its lowest position and sealed at its base.

Referring again to the drawings, the vacuum forming assembly 1 comprises a platform base 2 and is seen to have an outer rectangular housing 3 seated on a resilient sealing pad 4 carried by the base. Extending outwardly from the opposite sides of housing 3 are tubular handles 5 and 6 by which the housing may be raised and lowered, the former being sealed by a cap 7. Handle 6 opens into housing 3 and serves as a connector to which a household vacuum cleaner hose 8 may be fitted, the other end of the hose being attached to a conventional vacuum cleaner 9. At the upper end of housing 3 is a pivoted frame 10 secured at one side by hinge 11 and at an opposite side by a flexible latch 13. Frame 10 serves to secure in place the plastic sheet 12 to be molded in sealed relationship with the housing, the seal being formed by clamping the margin of the sheet between a resilient gasket 15 carried by the frame 10 and the upper edge 16 of the housing 3, as is best shown in FIGURE 2. In two opposite corners of outer housing 3, as shown in FIGURES 2, 3 and 4, are guide rails 27 slidably engaged with guide rails 28 on the exterior surfaces of adjacent corners of inner housing 30 to be described presently. By limiting the contact between the two housings to the guide rails, the friction developed when the outer housing is raised and lowered on inner housing is very slight with the result that outer housing 3 is easily moved from its upper position, shown in FIGURE 2, for example, to the lower position shown in FIGURES 1 and 7.

Inner housing 30 is secured at its lower end to base 2 with which it is sealed by means of rubber sealing mat 4. Its upper end seats a perforated plate 31 the downwardly directed peripheral flange of which is supported by four detents 32 stamped inwardly from the sides of the housing. In wall 34 of inner housing 30 is an opening 35 positioned as to be in alignment with tube 6 when outer housing 3 is in its lower position, as shown in FIGURE 7, to connect the interior of the housing with the vacuum source. Positioned above opening 35 and carried by wall 34 in its exterior is a plate valve 36 loosely held in position by inwardly extending tangs 37 and 38. As may be seen in FIGURES 2 and 6, with the outer housing in its upper position or in a partially lowered position, respectively, while the vacuum is being applied, plate 36 is sucked against the inner opening of tube 6 so as to provide a seal to prevent any suction in the interiors of housings 3 and 30. As best seen in FIGURES 2 and 4, outwardly extending from walls 34 and 39 of housing 30 are detents 40 for supporting housing 3 in its upper position. In order to lower housing 3 on housing 30 from the position shown in FIGURE 2, the handles 5 and 6 are raised slightly and their outer ends pivoted upwardly, the walls of housing 3 being sufficiently flexible to permit this action which results in the outward displacement of the wall above the detent 40 so that it can be telescoped over them, as shown in FIGURE 6.

Positioned above base 2 supported on telescoping posts 17 and 18 is a heater assembly 19 comprising an open bottomed box having dimensions approximately equal to that of frame 10 at the upper end of movable housing 30. Heating elements 24 encircle the interior surfaces of side walls 25 of the heating unit in spaced relationship, as shown in FIGURE 2, and are mounted on suitable insulators, being connected to a connector plug 22 adapted to receive current from the usual household circuit. Elements 24 are so arranged that the plastic sheet 12 during the heating operation is heated effectively. An exterior knob 21 is provided on unit 19 to enable the operator to swing it about its supporting post 18 to and from the position shown in FIGURES 1 and 2 for otherwise it would be in the way in loading and removing the plastic sheet 12. Upper post 18 on which heater 19 is mounted for swinging movement by bracket 20 may be withdrawn from rod 17 for storage and packing purposes.

Figure 6:
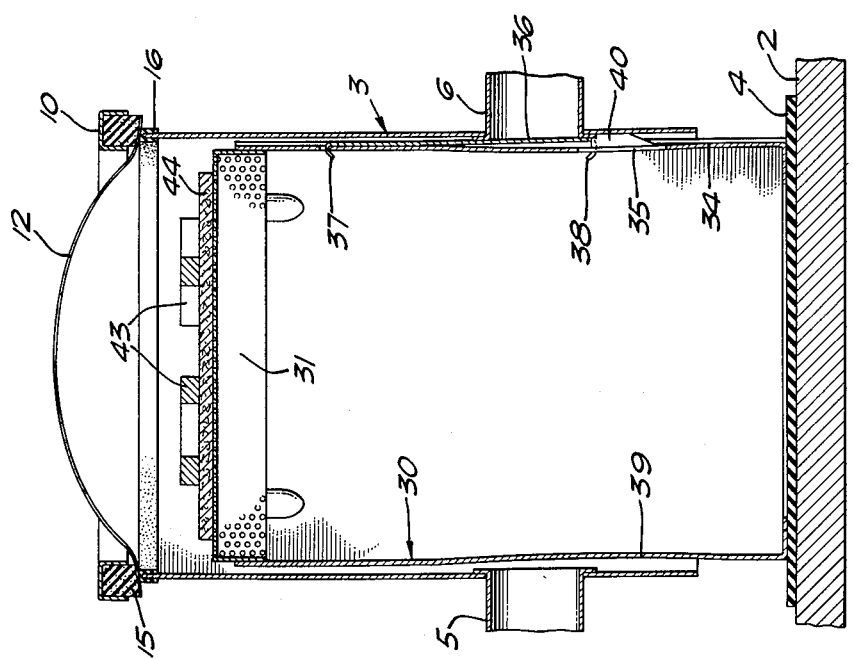
FIGURE 6 is a vertical section through the apparatus showing a sheet of plastic material bulging upwardly after it has been heated and while subjected to increased air pressure resulting from the lowering of the outer housing to an intermediate position between its lowest position, shown in FIGURE 7, and its highest position, shown in FIGURE 2.

In FIGURES 2, 4 and 6, a typical mold 43 having a design formed by block letters H and T, is shown positioned on a mat 44 on top of perforated supporting plate 31. The mold and mat may be of any material and the nature of their surfaces is transferred to the plastic sheet as will now be described.

In operation the mat 44 and the mold 43, shown in FIGURE 2, are placed upon the perforated supporting plate 31 at the top of the inner housing 30. Under and around the spaced design formed by the H and T, a felt mat imparts two desirable features to the process, one being that it makes a desirable design on the plastic and the other being that it is air pervious. Other types of support and material can be used, or no mat can be used, but in the latter instance the plastic extending around the letters would take the form of the perforated plate 41. In order to facilitate the air flow through the perforated plate when the vacuum source is put into communication with the interior of housing 30, it is desirable that the mat 44 be spaced inwardly from the edges of plate 31 as best seen in FIGURE 4.

After the mold is on plate 31, the plastic sheet 12 is placed upon the rim 16 of outer housing 3 and the hinged frame 10 is closed on it. The heater 19 should be brought up to temperature before being applied to the plastic and this can be accomplished while the mold and the plastic are being placed in the apparatus and the heater is out of alignment with the top of the housing 3. To raise the outer housing 3 and the plastic sheet 12 to the upper position for heating, the handles 5 and 6 of housing 3 are lifted and their outer ends pivoted slightly upwardly so as to move the lower extremities of the outer housing walls away from the detents 40 in order that the housing may be lifted above them and then be lowered to seat on them, as shown in FIGURE 2. The housing 3 remains in this position while the plastic is being heated. Before applying the heat to the plastic, the motor in the vacuum cleaner tank 9 should be turned on so as to make a vacuum source available up to the valve 36 which is then sucked against the inner opening of the tube 6.

Upon the heating unit reaching its full temperature it is swung into heating position squarely over the plastic 12 which heats up in about fifteen to thirty seconds, depending upon its thickness, so as to soften and sag appreciably in the middle, as shown in phantom line in FIGURE 5. At this time the outer housing 3 should be lowered immediately and this is accomplished by grasping the handles 5 and 6, again lifting the outer ends slightly so as to move the walls of the housing away from the detents 40. During the initial downward movement of outer housing 3 on inner housing 30 the suction available in the hose 8 through the handle 6 is sealed off by the valve 36 and the air pressure in the chamber formed by the two housings and the plastic sheet is increased by the telescoping action. As the plastic sheet 12 forms the top of the chamber this increase in air pressure bulges it upwardly to the full line position shown in FIGURES 5 and 6. As outer housing 3 is further lowered beyond the level shown in FIGURE 6, the vacuum is then communicated to the inner housing by the alignment of the opening 35 in the wall 34 of the inner housing 30 and the handle 6, as shown in FIGURE 7, and at this time both of the housings are sealed and the suction created by the vacuum cleaner tank immediately draws the plastic sheet 12 down over the mold by the draft of air as indicated by the arrows in FIGURE 8.

By heating the plastic sheet inwardly from its periphery so as to avoid excess thinning in the central portion and then by stretching the sheet so that it bulges outwardly, as shown in FIGURES 5 and 6, the plastic is properly conditioned to thin evenly on the mold, and thus eliminates one of the undesirable features which occurred in plastic forming in the prior art.

When the outer housing 3 is completely lowered and the plastic sheet has been drawn against the mold and to the perforated plate, the vacuum forming is completed. The heating unit is then rotated out of alignment with the housings and the plastic is permitted to cool for about thirty seconds during which time it sets. Formed sheet 12 is then removed from the outer housing by opening the frame clip 13, pivoting frame 10 and then lifting the plastic and the mold from the perforated plate. After the mold and the sheet are out of the housing, the mold is removed from the underside of the formed sheet which at this time has the appearance shown in FIGURE 9.

The unit can be used to provide an air tight sealed enclosure for an object to be protected, if desired. The method is the same as that described except that the object would be spaced slightly above the perforated plate 31 and, if it has no closing bottom of its own, could be supported upon a piece of solid plastic, wood or cardboard. In operation the plastic sheet 12 would again be drawn down and around the object as though it were a mold and would seal against its lower edges, or if the supporting base suggested were used, against that.

While the particular apparatus for vacuum forming plastic sheets herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Vacuum molding apparatus for sheet thermoplastic material comprising, a housing having a transverse foraminous support for a mold pattern and including a relatively movable housing surrounding said pattern support, said movable housing having means thereon for temporarily securing sheet plastic thereto in a position generally parallel to said pattern, means exteriorly of said plastic securing means for heating said plastic to molding temperature, and means for moving said sheet plastic and mold toward one another while slightly compressing the intervening air and including means operable automatically by movement of said last mentioned means for suddenly evacuating the space within both of said housings, whereby the vacuum is effective to mold said plastic snugly into precise contact with the pattern.

2. Vacuum apparatus as defined in claim 1 characterized in the provision of means providing a continuous source of vacuum of sufficient capacity to evacuate said housings suddenly, and valve means for said vacuum source, said valve means being operatively connected to one of said housings and movable to open position as an incident of the movement of said sheet and of said pattern toward one another.

3. Vacuum molding apparatus as defined in claim 1 characterized in that the provision of means supporting said heating means movably includes means for adjusting the spacing of the same with respect to a sheet of plastic to be heated for molding as well as for shifting said heating means laterally to a position out of heating alignment with said plastic.

4. Vacuum molding apparatus for sheet thermoplastic material comprising, a first housing formed in part by a foraminous pattern support across the upper end thereof, a second housing loosely supported concentrically of the upper end of said first housing and open at its upper end, means on the upper end of said second housing for clamping sheet plastic thereacross, means for supporting said second housing in raised position with a plastic sheet clamped thereto and spaced appreciably above said pattern, and vacuum source means connectable with said first housing including valve means movable automatically to open position as said second housing is lowered about the upper end of said first housing.

5. Vacuum molding apparatus as defined in claim 4 characterized in the provision of manually controlled means operable for releasing said second housing from the raised position thereof and for suddenly lowering the same toward said pattern support thereby to increase the pressure of air trapped between said sheet and pattern to balloon the plastic upwardly immediately prior to evacuating said housing.

6. Vacuum molding apparatus as defined in claim 4 characterized in the provision of a large capacity source of vacuum having valve means for controllably connecting the same to the underside of said pattern support, said valve means being normally closed and including means for opening the same automatically as said plastic sheet is lowered toward the pattern.

7. Vacuum molding apparatus as defined in claim 6 characterized in that said second casing includes a pair of handgrips secured to opposed sides of said second housing and adapted to be grasped by an operator, said handgrips being effective to release said second housing from its raised position and utilized to lower the second housing abruptly.

8. Vacuum molding apparatus as defined in claim 7 characterized in that one of said handgrips is tubular and part of the means for connecting the interior of said housings with a source of vacuum.

9. A vacuum molding apparatus as defined in claim 4 characterized in that said housings are tubular and freely slidable axially of one another, and smooth-surfaced guide rail means carried in diametrically opposed relation between telescopically overlapping portions of said housings and cooperable to facilitate relative movement of said housings.

10. A vacuum molding apparatus as defined in claim 4 characterized in that said housings are loosely telescoped together whereby air trapped between the upper ends of said housings may escape slowly between the overlapped wall portions of the housings.

11. A vacuum molding apparatus as defined in claim 7 characterized in that one of said housings includes detent means projecting into the path of cooperating stop means on the other housing and so positioned as to hold said second housing in the raised plastic heating position thereof, and means for releasing said detent and stop means from holding engagement thereby permitting said second housing to move downwardly about the upper end of said first housing.

12. Vacuum molding apparatus for use in molding sheet thermoplastic material comprising, an upright tubular housing having a supporting base closing the lower end thereof, foraminous means having a multiplicity of openings mounted across the upper end of said housing and adapted to support mold pattern means thereon, an open-ended tubular member having a telescopic fit about the exterior upper end of said housing, means carried on the upper end of said tubular member for clamping a sheet of plastic material thereto and generally parallel to said foraminous means, heating means arranged to heat a sheet of plastic secured in said clamping means, means for holding said tubular member in a predetermined position to support the sheet of plastic elevated above said foraminous means while the plastic is being heated, means for maintaining a source of vacuum, and means for communicating said source of vacuum to the interior of said tubular housing in time delay sequence following the release of said tubular member and as an incident to the lowering of the same to bring the heated sheet of plastic into contact with the mold pattern means, the lowering of said tubular member along said housing member being effective to increase the air pressure in the space interiorly of the apparatus and below the heated plastic thereby to balloon the plastic outwardly away from the mold pattern and to hold the same out of contact with the pattern until said vacuum source is communicated to the interior of the apparatus to evacuate the space below the ballooned plastic and to pull the plastic instantly into high fidelity contact with said pattern means.

13. Vacuum molding apparatus as defined in claim 12 characterized in the provision of hand grip means on said tubular member and manipulatable to disengage said means for holding said tubular member in said predetermined elevated position.

14. Vacuum molding apparatus as defined in claim 12 characterized in that said means for communicating said source of vacuum to the interior of said housing comprises a tube connected with said vacuum source and opening inwardly through the side of said tubular member in an area opposite an imperforate part of said tubular housing when said tubular member is held in the upper plastic-heating position thereof and normally effective to seal the inlet to said tube closed, and an opening in said housing below said tube and adapted to open into the adjacent end of said tube as said tubular member is lowered to bring the heated plastic into contact with said mold pattern.

15. Vacuum molding apparatus as defined in claim 12 characterized in that said housing and said tubular member are four-sided, and guide rail means extending along diagonally opposed juxtaposed corners of said housing and of said tubular member and cooperating with one another to provide a free-running sliding connection to facilitate the telescopic movement of said housing and tubular member.

References Cited in the file of this patent

UNITED STATES PATENTS

| | | |
|---|---|---|
| 2,468,697 | Wiley | Apr. 26, 1949 |
| 2,690,593 | Abercrombie | Oct. 5, 1954 |
| 2,832,094 | Groth | Apr. 29, 1958 |
| 2,912,718 | Thiel | Nov. 17, 1959 |
| 2,911,677 | Weber | Nov. 10, 1959 |

FOREIGN PATENTS

| | | |
|---|---|---|
| 200,129 | Australia | Nov. 2, 1955 |
| 220,241 | Australia | Feb. 16, 1959 |

OTHER REFERENCES

"Airship Forming," Rubber and Plastics Age, July 1956, pp. 460–461.

"Deep Draw Vacuum Forming," Plastics Technology, January 1958, cover and p. 44.

"Problems Related to the Thermo-Forming of Toughened Polystyrene Sheet," British Plastics, December 1958, pp. 518–521.